United States Patent [19]

Pea

[11] Patent Number: 5,724,803
[45] Date of Patent: Mar. 10, 1998

[54] POWER SUPPLY CHAIN WITH ROLLER BAR CARRIER

[75] Inventor: Kevin I. Pea, Mayville, Wis.

[73] Assignee: Hubbell Incorporated, Orange, Conn.

[21] Appl. No.: 434,740

[22] Filed: May 4, 1995

[51] Int. Cl.⁶ .................................................... F16G 13/16
[52] U.S. Cl. ........................ 59/78.1; 59/900; 248/49
[58] Field of Search ........................ 59/78, 78.1, 900; 248/48, 49, 50, 51, 78

[56] References Cited

U.S. PATENT DOCUMENTS

| | | |
|---|---|---|
| 3,098,349 | 7/1963 | Waninger . |
| 3,330,105 | 7/1967 | Weber . |
| 3,382,668 | 5/1968 | Berkes et al. . |
| 3,503,579 | 3/1970 | Kurlandsky . |
| 3,779,003 | 12/1973 | Boissevain et al. . |
| 3,848,407 | 11/1974 | Moritz . |
| 4,018,411 | 4/1977 | Hennig . |
| 4,104,871 | 8/1978 | Moritz . |
| 4,129,277 | 12/1978 | Tenniswood . |
| 4,198,812 | 4/1980 | Hennig et al. . |
| 4,392,344 | 7/1983 | Gordon . |
| 4,462,565 | 7/1984 | Johnson . |
| 4,626,233 | 12/1986 | Moritz . |
| 4,769,985 | 9/1988 | Moritz . |
| 4,789,120 | 12/1988 | Spidel . |
| 5,014,506 | 5/1991 | Moritz . |
| 5,048,283 | 9/1991 | Moritz et al. . |
| 5,108,350 | 4/1992 | Szpakowski . |

FOREIGN PATENT DOCUMENTS

| | | |
|---|---|---|
| 84 11 975.6 | 11/1987 | Germany . |
| 42 25 016 | 2/1993 | Germany . |
| 2 007 326 | 5/1979 | United Kingdom . |
| WO95/15447 | 6/1995 | WIPO . |

OTHER PUBLICATIONS

Gleason PowerTrak, Cable/Hose Carrier Reference Guide, Cover page and pp. 6, 8, 9, 10, 11, 23, 35; dated 1994.
Gleason PowerTrak GRP, Non–Metallic Cable/Hose Carrier, Cover page and pp. 6, 21, 27; dated 1994.

*Primary Examiner*—David Jones

[57] ABSTRACT

A power supply chain comprises a plurality of power supply conduit carriers that include first and second side links and first and second cross-pieces connected between the side links to form the carrier. The cross-pieces each comprise an elongated cross-piece member having a channel extending along the length of the member and a plurality of low friction, cylindrical rollers disposed end-to-end along the length of and residing in the channel for rotation in the channel relative to the cross-piece member when in engagement with one or more power supply conduits, such as one or more cables, hoses, and the like, in the carrier.

9 Claims, 2 Drawing Sheets

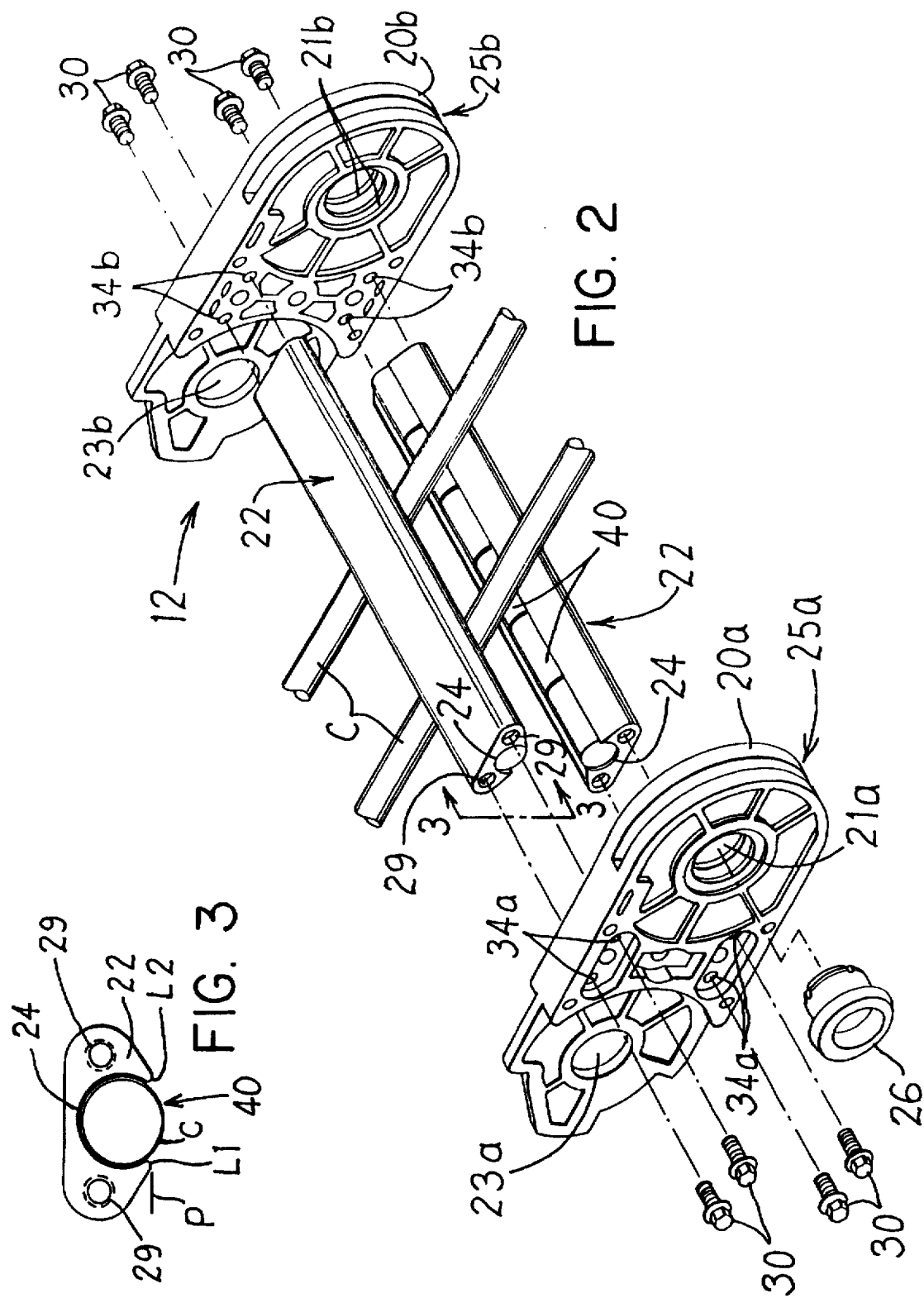

POWER SUPPLY CHAIN WITH ROLLER BAR CARRIER

FIELD OF THE INVENTION

The present invention relates to a power supply chain having a plurality of carriers connected together for supporting one or more power supply conduits, such as power supply cables or hoses, in a manner to provide electrical, fluid or other power to a relatively movable power consumer.

BACKGROUND OF THE INVENTION

Power supply chains are well known for supporting one or more power supply cables, hoses, and the like between a stationary power source and a relatively movable power consumer, such as, for example, a crane, machine tool slide, etc. The power supply chain typcially comprises a plurality of carriers pivotally connected end-to-end in some manner to form an elongated flexible support chain that extends from the statonary power source in a reverse bend to the power consumer to accommodate movement of the power consumer relative to the power source.

A carrier of the power supply chain typcially comprises laterally spaced apart, parallel chain side links interconnected by a pair of cross-pieces that are fastened to the side links. The cross-pieces are spaced apart in a direction perpendicular to the length of the power supply chain to provide an opening in which one or more of the power supply conduits (e.g. cable or hose) are received, confined and supported along the length of the chain. One or more separators may be positioned beteween the cross-pieces in a direction perpendicular to the cross-pieces to define multiple openings for confining and grouping power conudits of one type (e.g. electrical cables) or size (e.g. large diameter) in an opening and one or more power conduits of different type (e.g. fluid hoses) or size (e.g. relatively small diameter) in another opening.

In the past, aluminum cross-pieces have been provided with low friction (e.g. nylon) stationary inserts to reduce wear of the power supply conduits as supported by the carriers. The plastic inserts may be of complex configuration to form circular openings to receive one or more power supply conduits, or simply elongated inserts for engaging the power supply conduits. The separators, if present, have been made of suitable plastic material to this same end. Moreover, cross-pieces each comprising a stationary, cylindrical metallic rod have been sheathed with a nylon sleeve that rotates on the rod.

The present invention provides a power supply chain having improved carriers in a manner to reduce frictional wear of one or more power supply conduits supported by the chain while simplifying the construction of the chain carriers as well as their maintenance.

SUMMARY OF THE INVENTION

The present invention provides a power supply chain comprising a plurailty of power supply conduit carriers. The carriers each include first and second side links and first and second crosspieces connected between the side links to form the carrier. The cross-pieces each comprise an elongated cross-piece member having a channel extending along the length of the member and a plurality of cylindrical rollers disposed end-to-end along the length of and residing in the channel for rotation in the channel relative to the cross-piece member by engagement with the power supply conduit(s) received in the carrier. The rollers preferably comprise low friction material, such as plastic material (e.g. nylon material having a lubricant dispersed therein) or hardened metallic material.

The cross-piece member preferably is configured to overlie or encompass the rollers over a majority of their circumference (e.g. at least about 75% of the roller circuference) as they rotate in the channel. The radial clearance between the wall defining the channel and the rollers is controlled to provide free rotation of the rollers in the channel by engagement with the power supply conduit(s).

The carrier is easily assembled by positioning the rollers in the channel of each cross-piece member and then fastening the crosspiece members between the side links by the fasteners or other means. For maintenace purposes, one or more rollers are readily removed from the channel for replacement, if necessary, by unfastening the cross-piece members from the side links, removing the roller(s) through the open end of the channel, and positioning the replacement roller(s) in the channel. The cross-piece members then are fastened to the side links.

The present invention as well as objects and advantages thereof will become more readily apparent from the following detailed description taken with the following drawings.

DESCRIPTION OF THE DRAWINGS

FIG. 2 is an exploded, perspective view of a power chain carrier in accordance with an embodiment of the invention.

FIG. 3 is an end elevation of a cross-piece member encompassing a roller disposed in the channel of the cross-piece member.

DESCRIPTION OF THE INVENTION

Figure 1:
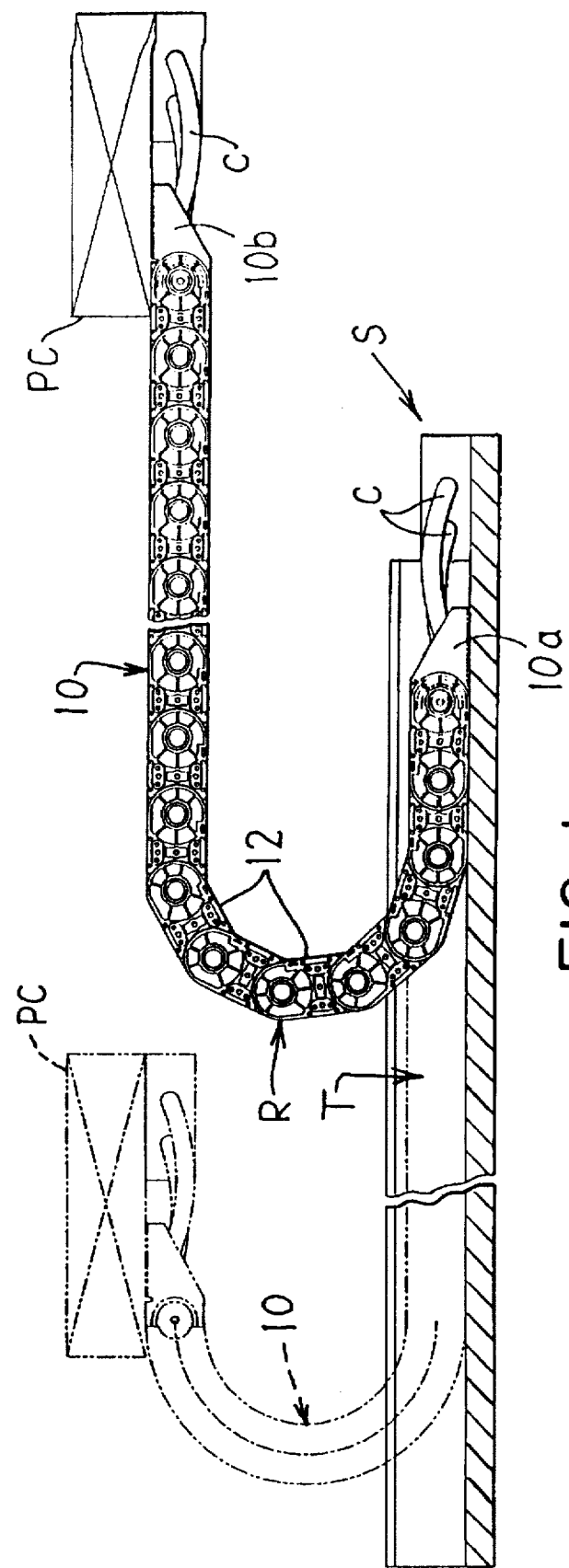
FIG. 1 is a side elevation schematically illustrating power supply chain between a statonary power source and a relatively movable power consumer.

Referring to FIG. 1, a power supply chain 10 comprises a plurality of carriers 12 pivotally connected end-to-end in conventional manner to form an elongated flexible support chain that extends from the statonary power source S, such as electrical power supply cables C, in a reverse bend R to a movable power consumer PC to accommodate movement of the power consumer PC relative to the power source S. The power supply chain 10 is shown in FIG. 1 in dashed lines at a starting position and in solid lines at an extended position to accommodate movement of the power consumer. The power supply chain 10 optionally can reside partially in a stationary guide tray T shown schematically in FIG. 1 and extend out of the open upper side of the guide tray in conventional manner for movement as needed to accommodate movement of the power consumer PC. The power consumer PC can comprise a variety of power consuming equipment, such as a crane, a machine tool slide, a conveyor, etc. having an electrical or fluid powered motor of conventional type. The power supply chain 10 includes a stationary end 10a proximate the power source S and an opposite end 10b fastened to the power consumer PC for movement therewith.

Referring to FIGS. 2–3, a carrier 12 constructed pursuant to an embodiment of the invention is illustrated. The other carriers 12 connected between the chain ends 10a and 10b are of like construction. Each carrier 12 includes first and second, generally parallel metal or plastic side links 20a, 20b connected together by first and second elongated crosspiece bars or members 22 extending between the side links in a direction perpendicular to the length of the chain 10.

The side links 20a, 20b each are elongated in the direction of the chain length and include pivot openings 23a, 23b at one end that are received in the forked yokes 25a, 25b of the end of the next adjacent side link in alignment with the respective pivot openings 21a, 21b of the yokes. A pivot pin 26 (only one shown) extends through each respective set of aligned openings 21a, 23a and 21b, 23b of the adjacent carriers in conventional manner to pivotally interconnect adajacent carriers 12. In this way, the power supply chain 10 is rendered flexible so that the chain can be configured in the reverse bend R to accommodate movement of the power consumer PC relative to the power source S.

The cross-piece members 22 are identical and include a C-shaped, elongated channel 24 extending along the complete length of the member 22 so as to provide a channel 24 having open ends. The cross-piece members 22 typically are extruded aluminum bars, although the invention is not so limited. As is apparent in FIG. 2, the C-shaped channels 24 face each other when fastened between the side links 20a, 20b to form the carrier.

The cross-piece members 22 include a pair of tapped (threaded holes 29 at each end for receiving a pair of threaded fasteners 30 that extend through openings 34a, 34b in the side links 20a, 20b as will be apparent from FIG. 2. The cross-piece members 22 thereby are rigidly connected between the side links 20a, 20b to provide relatively rigid carrier 12.

A plurality of cylindrical rollers 40 are disposed in end-to-end array along the length of and residing in the channel 24 of each cross-piece member 22. There is a radial clearance between the rollers and the arcuate (partially cylindrical) wall defining the C-shaped channel 24 so that the rollers 40 are freely rotatable in the channel 24 relative to the cross-piece members by engagement with one or more power supply conduits C (two shown), such as one or more electrical cables, fluid hoses, and the like, received in the carrier 12. A typical diameter of the channel 24 is 0.50 inch and diameter of the rollers 40 is 0.48 inch to provide a radial clearance therebetween of about 0.01 inch. The end-to-end clearance of adjacent rollers 40 typcially is 0.01 inch to provide axial free-play. The rollers 40 preferably comprise low friction material, such as plastic having lubricant dispersed therein molded to cylindrical shape. Rollers comprising nylon material having a lubricant, such as molybdenum disulfide or teflon dispersed therein, are useful to this end, although hardened metallic rollers, such as hardened steel can be used as well. The ends of the rollers 40 may have an optional circumferential chamfer or bevelled surface C transitioning from the axial ends to the cylindrical roller side as shown in FIG. 3, for example, as a result of deburring the roller ends.

The wall defining the C-shaped channel 24 of the cross-piece members 22 is configured to overlie or encompass the rollers 40 over a majority of their circumference (e.g. at least about 75% of the roller circumference) as best illustrated in FIG. 3. In this way, the rollers 40 are sufficently confined in the channel 24 as to prevent unintentional movement of the rollers 40 out of the channel 24 and to maintian roller orientation axially in the channel 24 so as to minimize off-axial wobbling of the rollers as they rotate by engagement with the power supply conduit(s) received in the carrier 12. At the same time, a sufficient region of the rollers 40 is exposed for engagement with the power supply conduit (s) C in the carrier without the conduit(s) C engaging the cross-piece members 22. To this end, the rollers 40 extend about 0.12 inch beyond a plane P intersecting the opposing sides lips L1, L2 of the channel 24, FIG. 3. Although six rollers 40 are shown in FIG. 2 residing in the channel 24, the invention is not so limited and can be practiced using fewer or greater numbers of rollers.

The carrier 12 is advantageous in that the rollers 40 reduce frictional wear of the power supply conduit(s) received and supported by the carrier 12, while the construction and assembly of the carriers 12 is simplified. For example, the carrier 12 is assembled by positioning the rollers 40 in the channel 24 of each cross-piece member 22. The cross-piece members 22 then are fastened to the side links 20a, 20b by the fasteners 30. Maintenance of the power supply chain 10 also is facilitated in that one or more rollers 40 can be readily removed from the channel 24 of either cross-piece member 22 for replacement, if necessary. For example, one or more rollers 40 can be removed by unfastening the cross-piece members 22 from the side links 20a, 20b by unthreading the fasteners 30. The rollers 40 then can be removed through an open end of the channel 24. One or more replacement roller(s) 40 can be positioned in the channel 24. The cross-piece members 22 then are refastened to the side links 20a, 20b by the fasteners 30. Maintenance of the power supply chain thus is facilitated and rendered less time consuming.

Although the present invention has been described hereabove with respect to certain embodiments thereof, the invention is not so limited and modifications and changes can be made thereto without departing from the scope of the invention as set forth in the appended claims.

I claim:

1. In a power supply chain comprising a plurality of power supply conduit carriers, said carriers each including first and second side links and at least one elongated cross-piece member connected between the side links, said cross-piece member having a channel extending along the length thereof, and a plurality of cylindrical rollers disposed in end-to-end array along the length of and residing in the channel for rotation therein relative to the cross-piece member by engagement with one or more power supply conduits in said carrier.

2. The chain of claim 1 wherein the rollers comprise low friction rollers disposed in the channel.

3. The chain of claim 2 wherein the rollers comprise plastic having a lubricant dispersed therein.

4. The chain of claim 2 wherein the rollers comprise hard metal.

5. The chain of claim 1 wherein each cross-piece member is configured to encompass the rollers over a majority of their circumference as they rotate in the channel.

6. The chain of claim 5 wherein each cross-piece encompasses about 75% of the circuference of the rollers.

7. The chain of claim 5 wherein a radial clearance is provided between a wall defining said channel and said rollers such that said rollers are freely rotatable in said channel.

8. The chain of claim 1 wherein each cross-piece member comprises a metal extrusion.

9. The chain of claim 1 wherein said cross-piece members are fastened to said side links by threaded fasteners.

\* \* \* \* \*